US010025817B2

(12) United States Patent
Mavinakuli et al.

(10) Patent No.: US 10,025,817 B2
(45) Date of Patent: Jul. 17, 2018

(54) BUSINESS INFORMATION SERVICE TOOL

(71) Applicant: SAP SE, Walldorf (DE)

(72) Inventors: Prasanna Bhat Mavinakuli, Sagar Tq. (IN); Dipti Sengupta, Ahmedabad (IN); Rahul Tiwari, Allahabad (IN); Pranav Acharya, Mumbai (IN)

(73) Assignee: SAP SE, Walldorf (DE)

( * ) Notice: Subject to any disclaimer, the term of this patent is extended or adjusted under 35 U.S.C. 154(b) by 596 days.

(21) Appl. No.: 14/656,296

(22) Filed: Mar. 12, 2015

(65) Prior Publication Data

US 2016/0267090 A1  Sep. 15, 2016

(51) Int. Cl.
G06F 7/00        (2006.01)
G06F 17/30       (2006.01)
G06Q 10/06       (2012.01)

(52) U.S. Cl.
CPC ... *G06F 17/30389* (2013.01); *G06Q 10/0637* (2013.01); *G06Q 10/0639* (2013.01)

(58) Field of Classification Search
USPC ........................................ 707/648, 703, 826
See application file for complete search history.

(56) References Cited

U.S. PATENT DOCUMENTS

| 6,698,013 | B1 * | 2/2004 | Bertero | G06F 8/71 717/101 |
| 2008/0154737 | A1 * | 6/2008 | Linkswiler | G06Q 30/0237 705/14.37 |
| 2009/0222365 | A1 * | 9/2009 | McGlynn | G06Q 30/02 705/30 |
| 2010/0100470 | A1 * | 4/2010 | Buchanan | G06Q 10/10 705/35 |
| 2010/0153238 | A1 * | 6/2010 | Zaghloul | G06Q 10/00 705/28 |
| 2011/0066493 | A1 * | 3/2011 | Faith | G06Q 20/40 705/14.49 |
| 2013/0046766 | A1 * | 2/2013 | Shishido | G06F 17/30752 707/741 |
| 2014/0253455 | A1 * | 9/2014 | Mauro | G06F 3/167 345/169 |
| 2015/0370616 | A1 * | 12/2015 | Peterson | G06F 9/541 719/320 |

* cited by examiner

Primary Examiner — Cheyne D Ly
(74) Attorney, Agent, or Firm — Fish & Richardson P.C.

(57) ABSTRACT

The disclosure generally describes computer-implemented methods, software, and systems, including a method for providing suggestions. Transaction information is received that is associated with user actions during use by a user of a business intelligence tool. Each user action is associated with an operation in a particular stage of processing on business data obtained from one or more databases. The transaction information for a particular user action includes a user identifier identifying the user performing the particular user action, stage information, an associated operation, and parameters. The transaction information is stored. Subsequent user actions are monitored, including determining a time at which stage conditions match stage information in the stored transaction information. In response to determining matching stage conditions, pertinent transactions are identified. Suggestions are created. Each suggestion is associated with groups of one or more transactions of the pertinent transactions. The suggestions are provided for presentation to the user.

20 Claims, 8 Drawing Sheets

FIG. 4

Campaign Analysis — 402

File  Edit  View  Data  Help

— 406 — 406a

Prepare  Visualize  Compose  Share

Marketing VI Data FINAL.xyz/DataSet | Calculation ▾ | Combine as ▾ | New Dataset No filter applied currently on the dataset

408 →

| Source 410 | Date 412 | City 414 | Region 416 | SubRegion 418 |
|---|---|---|---|---|
| Facepage | 8/8/2012 | Omaha | Nebraska | Douglas |
| Facepage | 8/13/2012 | Omaha | Nebr | Region: 'Nebraska' |
| Facepage | 8/5/2012 | St. Louis | Missouri | St. Louis (City) |
| Tooter | 8/15/2012 | Austin | Texas | Travis |
| Tooter | 8/8/2012 | Omaha | Nebraska | Douglas |
| Tooter | 8/6/2012 | Birmingham | Alabama | Jefferson |
| Free trial offer | 8/12/2012 | Minneapolis | Minnesota | Hennepin |
| Free trial offer | 8/16/2012 | Minneapolis | Minnesota | Hennepin |
| Free trial offer | 8/8/2012 | Oklahoma City | Oklahoma | Oklahoma |
| Free trial offer | 8/17/2012 | St. Louis | Missouri | St. Louis (City) |

↙ 404

440 →

MEASURES  7
 # Interactions  Sum
 # Leads_Sum  Sum
 # Opportunities_Sum  Sum
 Cust Sat Score  Average DIMENSIONS  25
 default
 Country (Country Level)
 default
 Year (Year Level)
 # Interactions

⇒ 442

3 dimension(s) identified as geographic or time-based

400 ↙

APPLY TOP TRANSACTIONS 432

| 422 | 424 | 426 | 428 | 430 | 432 | 434 | 436 | 438 |
|---|---|---|---|---|---|---|---|---|
| ID | Feature | Favorite | Frequency | References | Parameters | Column | Category | Rank |
| 1 | Apply_Numeric_Filter | 2 | 2 | 1 | 1.....12 | Month | Prepare | 1 |
| 2 | Apply_Measure | 1 | 2 | 0 | Upside | Forecast | Prepare | 2 |
| 3 | Apply_Group_ByRange | 1 | 1 | 0 | 3010000,30000 | Opportunity | Chart | 3 |
| 4 | Apply_duplicate | | 1 | 0 | 1.....12 | Year | Share | 4 |

420 →

BUSINESS INFORMATION SERVICE TOOL

BACKGROUND

The present disclosure relates to information presentation.

Users of data may have different roles and thus may require different uses of the same data. For example, a person in the accounting department may have one use of accounting data, while an executive of the company might have a different use. Each of these users may use their own set of queries and/or other means tailored to their needs for data.

SUMMARY

The disclosure generally describes computer-implemented methods, software, and systems for providing suggestions. For example, transaction information is received that is associated with user actions during use by a user of a business intelligence tool. Each user action is associated with an operation in a particular stage of processing on business data obtained from one or more databases. The transaction information for a particular user action includes, for example, a user identifier identifying the user performing the particular user action, stage information identifying the particular stage of the processing in which the particular user action occurs, the operation associated with the particular user action, and one or more parameters used in the operation. The transaction information is stored. Subsequent user actions by the user are monitored, including determining a time at which stage conditions associated with a current session for the user match the user and the stage information in the stored transaction information. In response to determining that matching stage conditions exist, pertinent transactions associated with the matching stage conditions are identified. One or more suggestions are created for presentation to the user. Each suggestion of the one or more suggestions is associated with groups of one or more transactions of the pertinent transactions. The one or more suggestions are provided for presentation to the user.

The present disclosure relates to computer-implemented methods, software, and systems for providing suggestions. One computer-implemented method includes: receiving transaction information associated with user actions during use by a user of a business intelligence tool, each user action associated with an operation in a particular stage of processing on business data obtained from one or more databases, the transaction information for a particular user action including: a user identifier identifying the user performing the particular user action, stage information identifying the particular stage of the processing in which the particular user action occurs, the operation associated with the particular user action, and one or more parameters used in the operation; storing the transaction information; monitoring subsequent user actions by the user, including determining a time at which stage conditions associated with a current session for the user match the user and the stage information in the stored transaction information; and in response to determining that matching stage conditions exist: identifying pertinent transactions associated with the matching stage conditions, creating one or more suggestions for presentation to the user, each suggestion of the one or more suggestions being associated with groups of one or more transactions of the pertinent transactions, and providing the one or more suggestions for presentation to the user.

In some implementations, self-service business intelligence (BI) tools can be used, e.g., that provide access to the data in different ways by different users and/or types of users. For example, one motive behind the use and the evolution of self-service BI tools can be to increase the ease of use for an end user, who may be an executive or a common user. In a typical scenario, for example, each of these end users can perform the same actions on different data from the same domain.

Self-service BI tools, such as desktop intelligence tools, can allow users to view their data in the form of charts and graphs and hence spot trends in the data. However, creating such visual aids can generally take a long time to create when done manually each time. For example, the user may have to filter the data according to certain requirements, choose a visual representation type, and finally save, display and share the completed result. For businesses performing a number of routine but lengthy activities, having an automated solution can act as a time saver.

Consider an example of a mid-level manager of a pharmaceutical company. The manager may have several pharmacy stores to oversee. Every month, the manager may receive raw operating data from pharmacy stores and will need to manipulate the data before presenting the data to the manager's superiors. For each store, for example, some data pertaining to daily functioning (e.g., daily wages and order details) may be of no use to upper management and may be removed. Certain formulas may also have to be applied to calculate profit/loss, aggregate sales, and/or other results, and new columns may be created for the same. Once the desired data is chosen, the data may have to be presented in an easily understandable visual format and shared. This sequence typically would have to be repeated for every store under the manager's control. In some implementations, the manager's actions on the data can be tracked from one store, and the tracked information can allow the manager to perform the same actions on the other related data more easily, e.g., with only a few clicks, reducing the manager's workload.

Solutions to achieve these results can include, for example, implementing a software solution in which users, based on their role (e.g., as a client, a company executive, or a system administrator) are presented with recommendations based on their most relevant actions. For example, user transactions can be registered and stored in a database. Based on the stored information, suggestions can be provided to help the user save time on lengthy but routine activities. For example, instead of having to manually filter the data, an extension can enable users to directly select the required operations and parameters based on the choices they had used the previous time. Specifically, while representing and sharing the final data, the software can suggest the user's previously favored choices. Knowing which features are most relevant and automating them, businesses can prioritize and speed up their workflows and deprioritize the little used features to keep them out of the way.

Some implementations include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes (or causes the system) to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect, combinable with any of the previous aspects, the method further comprises, after providing the one or more suggestions: receiving an identification of a particular suggestion from the provided one or more suggestions; performing, using the identified particular suggestion, a new operation using transaction information for the particular suggestion in a new operation on business data being manipulated by the user, including using the one or more parameters from the stored transaction information; and updating the stored transaction information for the particular suggestion to indicate an additional use of an associated user action.

In a second aspect, combinable with any of the previous aspects, stages are sequential and are selected from the group comprising a data preparation stage in which data is prepared, a visualization stage in which data is presented in a visualization to the user, a synthesis stage in which a business story is created from one or more visualizations, and a sharing stage in which business information associated with previous stages is shared.

In a third aspect, combinable with any of the previous aspects, user actions in the data preparation stage include actions selected from a group comprising: selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset.

In a fourth aspect, combinable with any of the previous aspects, the method comprises ranking the suggestions to produce ranked suggestions.

In a fifth aspect, combinable with any of the previous aspects, each ranked suggestion is ranked according to a transaction rank determined from one or more of a favorite index, a frequency count, and a references count.

In a sixth aspect, combinable with any of the previous aspects, the one or more suggestions provided to the user include, for each ranked suggestion, a suggestion identifier, a feature name, the favorite index, the frequency count, the references count, one or more parameters, one or more column names associated with the one or more parameters, a stage category, and a transaction rank.

In a seventh aspect, combinable with any of the previous aspects, each ranked suggestion is further ranked using a measure of time since an occurrence of an associated user action.

The subject matter described in this specification can be implemented in particular implementations so as to realize one or more of the following advantages. First, determining and automating most relevant features can help a business prioritize and speed up their workflows. Second, little used features can be deprioritized to keep them out of the way.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 4 shows an example user interface for working with business data from which transaction information is obtained.

Like reference numbers and designations in the various drawings indicate like elements.

DETAILED DESCRIPTION

Figure 1:
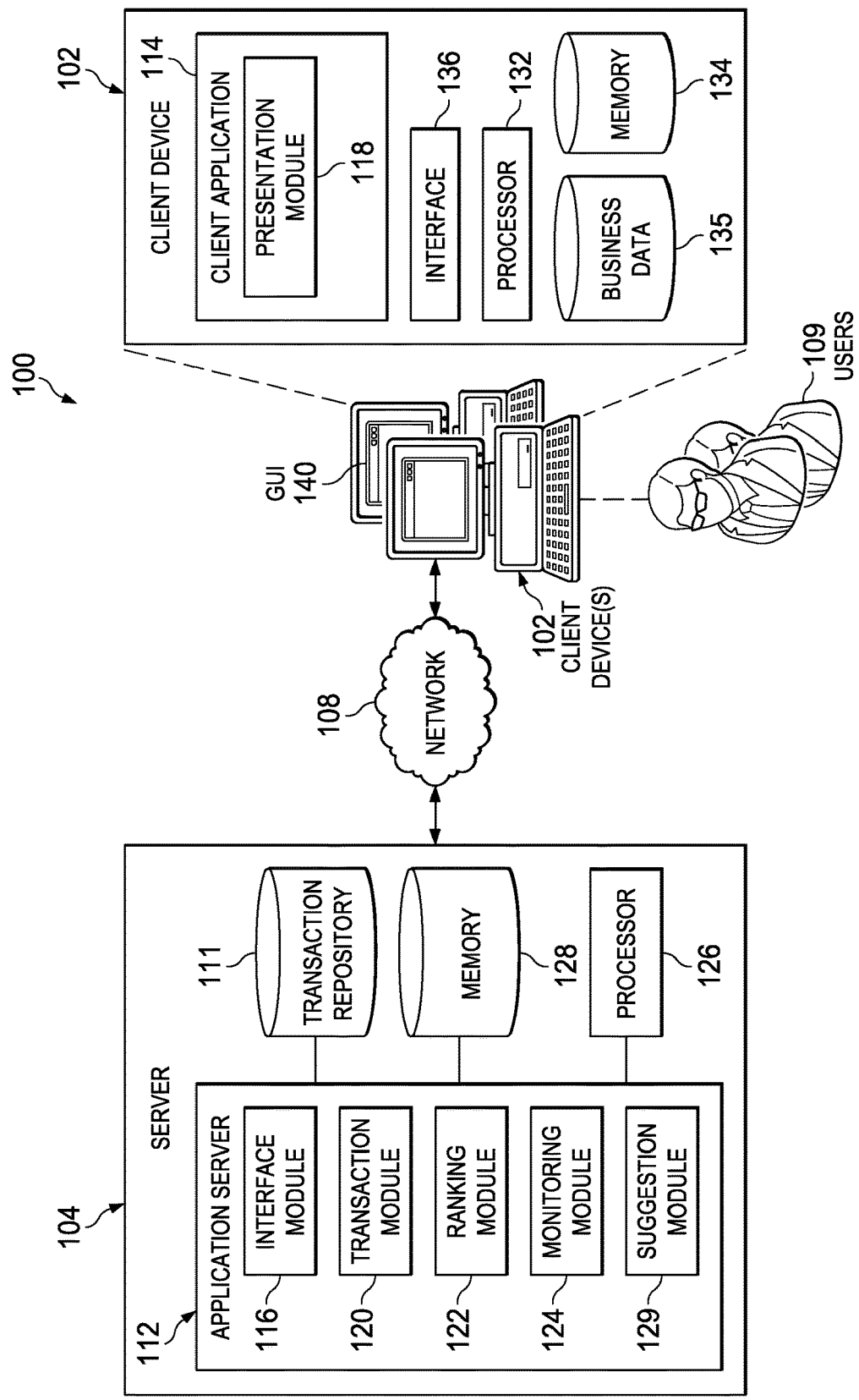
FIG. 1 is a block diagram of an environment for providing suggestions.

This disclosure generally describes computer-implemented methods, software, and systems for providing suggestions. For example, the suggestions can be provided to a user who is using a business intelligence tool. The suggestions can be generated, for example, based on prior transactions of the user. When one of the suggestions is chosen and accepted by the user, for example, the transaction is repeated, e.g., without requiring the user to re-formulate the command needed to set up the transaction.

In some implementations, suggestions can include recommendations that are based on most relevant activities of a user. For example, relevant transactions can be determined from transactions that occur for a user and the frequency of use by the user. The transaction information can be stored in a database, e.g., in a transaction repository that is later used to suggest transactions to the user. The user can accept the suggestion made, e.g., with a single click in a user interface. Once selected, appropriate actions associated with the suggestion are applied on the data. Suggestions provided to the user can be associated with a stage of processing, e.g., in addition to previous actions taken by the user. For example, the options available in a particular stage can be available to all succeeding stages while the reverse will not be true. For example, operations in a data preparation stage can be available in subsequent stages, but operations from a visualization are not available in the data preparation stage. User actions can be constantly recorded over time, and new transactions can be added to the database, e.g., for subsequent identification of suggestions. In some implementations, application code that supports the process of storing transaction information and identifying suggestions can be implemented as plugins and/or other components. As a result, the following use cases can be supported.

In a use case associated with medical data, data may be handled by patients, doctors, nurses, pharmaceutical executives, and/or other people. A pharmaceutical executive, for example, can use business intelligence tools or software to filter and process the data about a particular brand of medicine or the sales in a particular area. A similar operation may be used to analyze the same kind of data from another region. Instead of having to manually set parameters and filters, a single click recommendation can accomplish the same much faster.

In a use case associated with automobile data, the data may be handled by administrators, dealers and customers. Administrators, for example, may be able to add to the data and rename columns as well as merge data. A dealer, for example, may use the software to look for factors such as stores with high profits or losses, sales by vehicle, sales by segment, regions with highest returns, or other information.

In a use case associated with stock data, information may be used by both stock brokers and by the customers. A stock broker, for example, can edit and update stock prices, search for a particular range of stocks and make recommendations for buying and selling for his/her client. The client, on the other hand, may be able to see the past prices for stocks in their portfolio, see a range of stocks given a parameter, or decide on the amount of the portfolio to be bought or sold.

In a use case associated with data in the academic domain, some information may be of use to the higher officials in colleges and universities. Raw student data, for example, can be filtered to sort students by department, locate course information and grades, and identify top-performing students. Lecturers can use the data about student marks to calculate median marks and create histograms for a course. The data can finally be shared in a graphic form for students to view their relative rankings and for university officials to assess the progress of the student body at regular intervals.

In a use case associated with corporate data, a managing director of a large company may use data about his/her employees to measure progress and adherence to company goals. The data can be further filtered according to department, project, manager, and/or overall productivity. The managing director can view the relative performance by department or by employee. This activity can be repeated on a regular basis in a matter of minutes once the initial settings have been stored in the database.

In each of these use cases, the user using the data may perform transactions that are likely to be repeated at a later time. By capturing transaction information over time, suggestions associated with the transactions can be provided to users when a specific context is determined, e.g., at a particular stage of use of a particular data set. In some implementations, steps to achieve these results can include the following.

User actions are tracked and recorded. For example, each user action is assumed to be a transaction that is stored along with various parameters.

Features are ranked according to their importance and usage. For example, to suggest transactions to the user in the future, the user's present actions can be ranked according to an algorithm that takes into account factors such as the frequency of the user's action, the data it affects, and how early the action is performed. Based on a transaction's rank, a transaction will be recommended to the user using a user interface.

Transactions are categorized. For example, to prevent unnecessary suggestions, all the available actions can be categorized into transactions which are available to a user at a particular stage of working. The transactions in the early stages, for example, can be available to the user throughout subsequent stages, while later stage transactions are not available for earlier stages. In some implementations, business intelligence analysis can include four stages in which users first prepare the data, visualize the data, create a story out of the visualizations, and share the stories/visualizations (e.g., with other users).

Different types of transactions can be used in different stages individual stages. For example, in the data preparation stage, transactions can include select dataset, select column, select custom range, filter, sort, convert, rename, create measure or dimension, create hierarchy, duplicate, group by range, and other data preparation operations. Visualize transactions, for example, can correspond to charts of various types that are made by selecting measures and dimensions. Compose transactions, for example, can allow users to present their graphs in the form of a board, a report, an infographic, or some other form (e.g., as well as specifying alignment or other formatting to be used). Share transactions, for example, can correspond to options to share the finished product by exporting the finished product as a file, publishing the finished product to a cloud server, mailing the finished product to one or more recipients, or sharing in some other way. Publishing, for example, can require additional user specification, e.g., choosing a destination, entering login details, specifying a list of recipients, or providing other information.

The usage data is stored. For example, once transactions are recorded, user actions can be stored in a database (e.g., a light weight database). Subsequent generation of suggestions can make use of the database, e.g., including identifying relevant transactions for the user and running a ranking algorithm to rate suggested transactions for the user. This database can be updated over time, e.g., adding new transactions and ranking them in relation to other user actions.

Application overhead can be avoided. For example, processing that is used to record, rank, store and finally recommend transactions can be done without slowing down the normal functioning of the application.

FIG. 1 is a block diagram of an environment 100 for providing suggestions. Specifically, the illustrated environment 100 includes, or is communicably coupled with, plural client devices 102, and a server 104, connected using a network 108. For example, the environment 100 can be used to present information on the plural client devices 102 using information available from the server 104. Further, input can be received from users 109 on the plural client devices 102 for use by the server 104. For example, users 109 can use business intelligence tools on the client devices 102, including performing transactions on data sets on which the tools operate. The server 104 can be used, for example, to store transaction information for transactions occurring on the client devices 102 and to make suggestions to users 109 based on previously-used transactions. In some implementations, the server 104 can be replaced, at least in part, using a plugin for a respective business intelligence tool. Further, part or all of the functionality of the server 104 can be included in applications executing on the client devices 102.

At a high level, the server 104 comprises an electronic computing device operable to collect, store and provide access to transaction information for use by the client device 102. The transaction information can be provided to the client device 102, for example, in the form of suggestions. A transaction repository 111, for example, can include transaction information received from the plural client devices 102. For example, users 109 can provide specific actions on business data 135 being used, manipulated or otherwise processed.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 104 may be adapted to execute any operating system, including Linux, UNIX, Windows, Mac OS®, Java™, Android™, iOS or any other suitable operating system. According to some implementations, the server 104 may also include, or be communicably coupled with, an e-mail server, a web server, a caching server, a streaming data server, and/or other suitable server(s). In some implementations, components of the server 104 may be distributed in different locations and coupled using the network 108.

In some implementations, the server 104 includes an application server 112 that performs processing at the server 104 that is needed to receive transactions from and provide suggestions to the client device 102. For example, the application server 112 can receive and store information collected over time for transactions that have occurred on the client device 102. Further, the application server 112 can access the stored transaction information to generate suggestions, as described below.

The application server 112 includes an interface module 116, for example, that can receive, from the client device 102, transaction information. For example, the information received can be information provided by the user in a client application 114, such as a front end for a business intelligence tool. Generally, the interface module 116 comprises logic encoded in software and/or hardware in a suitable combination and operable to communicate with the network 108. More specifically, the interface module 116 may comprise software supporting one or more communication protocols associated with communications such that the network 108 or the interface's hardware is operable to communicate physical signals within and outside of the illustrated environment 100.

The application server 112 further includes a transaction module 120. For example, the transaction module 120 can be used for receiving transaction information for transactions occurring on the client device 102 and storing the transactions in a transaction repository 111.

The application server 112 further includes a ranking module 122 that can be used to rank transactions and associated suggestions. The ranking, for example, can be used so that suggestions provided to users 109 are ranked according to their likely selection for use, such as based on frequencies of past use and other criteria.

The application server 112 further includes a monitoring module 124. For example, the monitoring module 124 can monitor processing on the client application 114 to detect times at which suggestions can be provided, e.g., when the user 109 is at a processing stage in which one or more transactions used in the past may be used again, depending on a current context.

The application server 112 further includes a suggestion module 129. As an example, the suggestion module 129 can generate suggestions for transactions that may be re-used on the client device 102. In some implementations, the suggestions generated by the suggestion module 129 for a particular user can include suggestions based on transactions of other users who have the same role as the particular user.

The server 104 further includes a processor 126 and memory 128. Although illustrated as the single processor 126 in FIG. 1, two or more processors 126 may be used according to particular needs, desires, or particular implementations of the environment 100. Each processor 126 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 126 executes the functionality required to receive and process requests from the client device 102 and analyze information received from the client device 102.

The memory 128 (or multiple memories 128) may include any type of memory or database module and may take the form of volatile and/or non-volatile memory including, without limitation, magnetic media, optical media, random access memory (RAM), read-only memory (ROM), removable media, or any other suitable local or remote memory component. The memory 128 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104. In some implementations, memory 128 includes the transaction repository 111. Other components within the memory 128 are possible.

Each client device 102 of the environment 100 may be any computing device operable to connect to, or communicate with, at least the server 104 via the network 108 using a wire-line or wireless connection. In general, the client device 102 comprises an electronic computer device operable to receive, transmit, process, and store any appropriate data associated with the environment 100 of FIG. 1.

The illustrated client device 102 further includes a processor 132, a memory 134, and an interface 136. The interface 136 is used by the client device 102 for communicating with other systems in a distributed environment—including within the environment 100—connected to the network 108, e.g., the server 104, as well as other systems communicably coupled to the network 108 (not illustrated). Generally, the interface 136 comprises logic encoded in software and/or hardware in a suitable combination and operable to communicate with the network 108. More specifically, the interface 136 may comprise software supporting one or more communication protocols associated with communications such that the network 108 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 102 includes the processor 132. Although illustrated as the single processor 132 in FIG. 1, two or more processors 132 may be used according to particular needs, desires, or particular implementations of the environment 100. Each processor 132 may be a central processing unit (CPU), an application specific integrated circuit (ASIC), a field-programmable gate array (FPGA), or another suitable component. Generally, the processor 132 executes instructions and manipulates data to perform the operations of the client device 102. Specifically, the processor 132 executes the functionality required to send requests to the server 104 and to receive and process responses from the server 104.

The illustrated client device 102 also includes a memory 134, or multiple memories 134. The memory 134 may include any memory or database module and may take the form of volatile or non-volatile memory including, without limitation, magnetic media, optical media, random access memory (RAM), read-only memory (ROM), removable media, or any other suitable local or remote memory component. The memory 134 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 102.

The illustrated client device 102 is intended to encompass any computing device such as a smart phone, tablet computing device, PDA, desktop computer, laptop/notebook computer, wireless data port, one or more processors within these devices, or any other suitable processing device. For example, the client device 102 may comprise a computer that includes an input device, such as a keypad, touch screen, or other device that can accept user information, and an output device that conveys information associated with the operation of the server 104 or the client device 102 itself, including digital data, visual information, or a graphical user interface (GUI) 140, as shown with respect to and included by the client device 102. The GUI 140 interfaces with at least a portion of the environment 100 for any suitable purpose, including generating user interface screens that support user interaction with the client application 114 (e.g., a business intelligence tool). A presentation module 118, for example, can be a component of the client application 114 that controls presentation of information to the use in the GUI 140. The presentation module 118 can also handle inputs received from the user and provide suggestions for display to the user.

Figure 2:
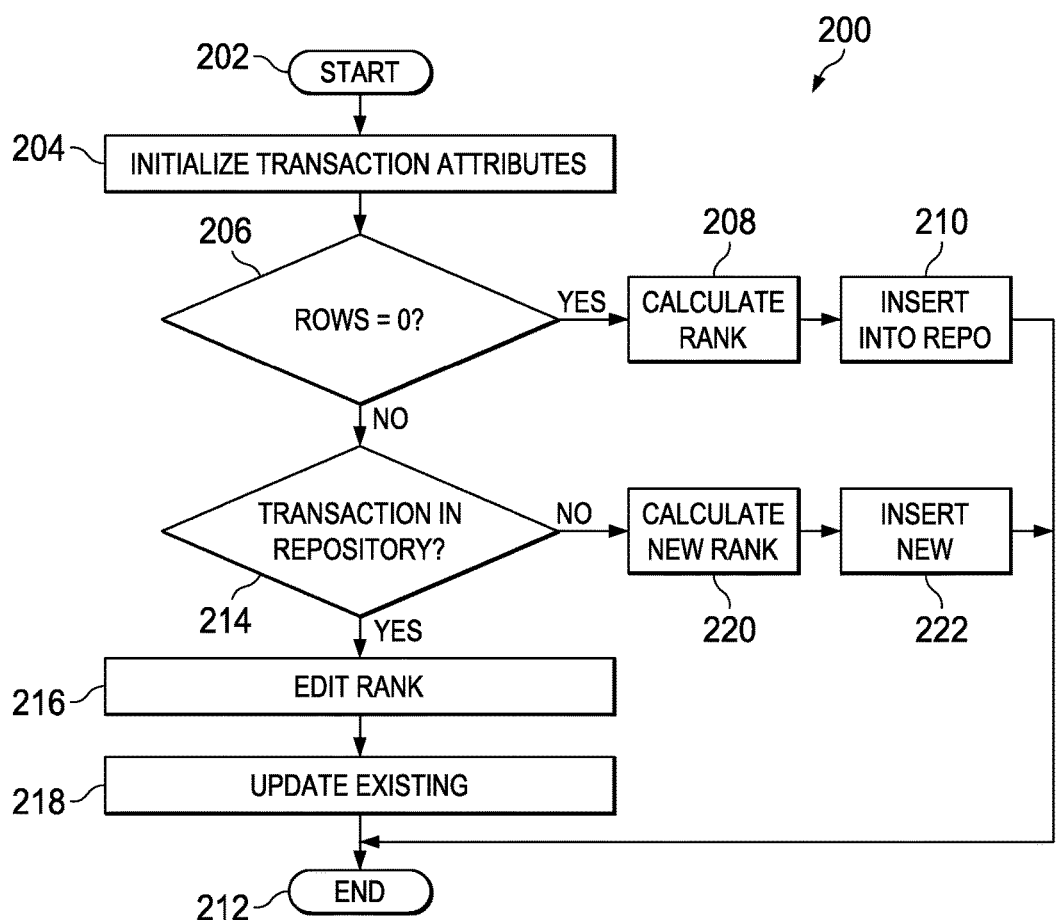
FIG. 2 is a flow diagram for an example process for recording transaction information for a user action.

FIG. 2 is a flow diagram for an example process 200 for recording transaction information for a user action. The user action, for example, can be a user action such as filtering a spreadsheet according to a filter. The user action can be performed, for example, by User A, such as while User A is working with marketing data and using a BI tool.

At 202, the process 200 can start. For example, the transaction repository 111 can be at an initial state in which no transactions have been recorded, e.g., for User A or other users.

At 204, transaction attributes are initialized. The transaction module 120, for example, can receive information for a transaction that has just occurred on the client device 102. Transaction information for the transaction can include, for example, a user identifier for the user who performed the transaction, stage information that identifies at least the stage in which the transaction occurred, an operation (e.g., filtering a data set) associated with the transaction, and associated parameters (e.g., the filtering criteria).

At 206, a determination is made whether any transaction information exists for the particular user for which the current transaction is being recorded. In some implementations, determining if transactions exist can include determining that there are zero rows in the transaction repository 111 for the user (e.g., User A). The transaction repository 111 can be at an initial state, for example, when transactions have yet to be recorded for User A.

At 208, e.g., if it has been determined that no transaction information exists for the particular user, a rank is calculated. The rank in this case can be a default rank, as the transaction information to be stored in the transaction repository 111 as the first and only transaction, e.g., for User A.

At 210, the transaction information is stored. For example, the transaction module 120 can store the transaction information in the transaction repository 111, e.g., as a new inserted row as the first stored transaction for User A. The stored transaction information, for example, can indicate that User A performed a particular user action, e.g., a filtering operation on marketing data.

At 212, the process 200 can end. For example, the process 200 can end regardless of whether the first transaction is being recorded, or the transaction being recorded is identical to a previously-stored transaction, at which time new ranks can be calculated, as described for steps 214-222.

At 214, e.g., if it has been determined that transaction information does already exist for the particular user (e.g., at least one row exists for the user in the transaction repository 111), a determination is made whether the particular transaction is in the transaction repository. The transaction module 120 can make the determination, for example, by looking for existing entries in the transaction repository 111 for entries having the user identifier for User A and matching stage information, a matching action, and matching parameters.

At 216, e.g., if it has been determined that the particular transaction already exists for the particular user, the rank associated with the transaction is edited. For example, the ranking module 122 can increase the rank for the transaction because the transaction has been used an additional time by User A.

At 218, the existing transaction is updated. For example, the transaction module 120 can update the corresponding information in the transaction repository 111, including the updated rank. As the processing is now complete, the process can end at step 212.

At 220, e.g., if it has been determined that the particular transaction does not yet exist for the particular user, a new rank is calculated. For example, the ranking module 122 can calculate a rank for the transaction. The calculated rank can depend, for example, on the ranks of existing transactions that are stored for User A.

At 222, a new entry for the transaction is added to the repository. For example, the transaction module 120 can store the new transaction in the transaction repository 111. As the processing is now complete, the process can end at step 212.

Figure 3:
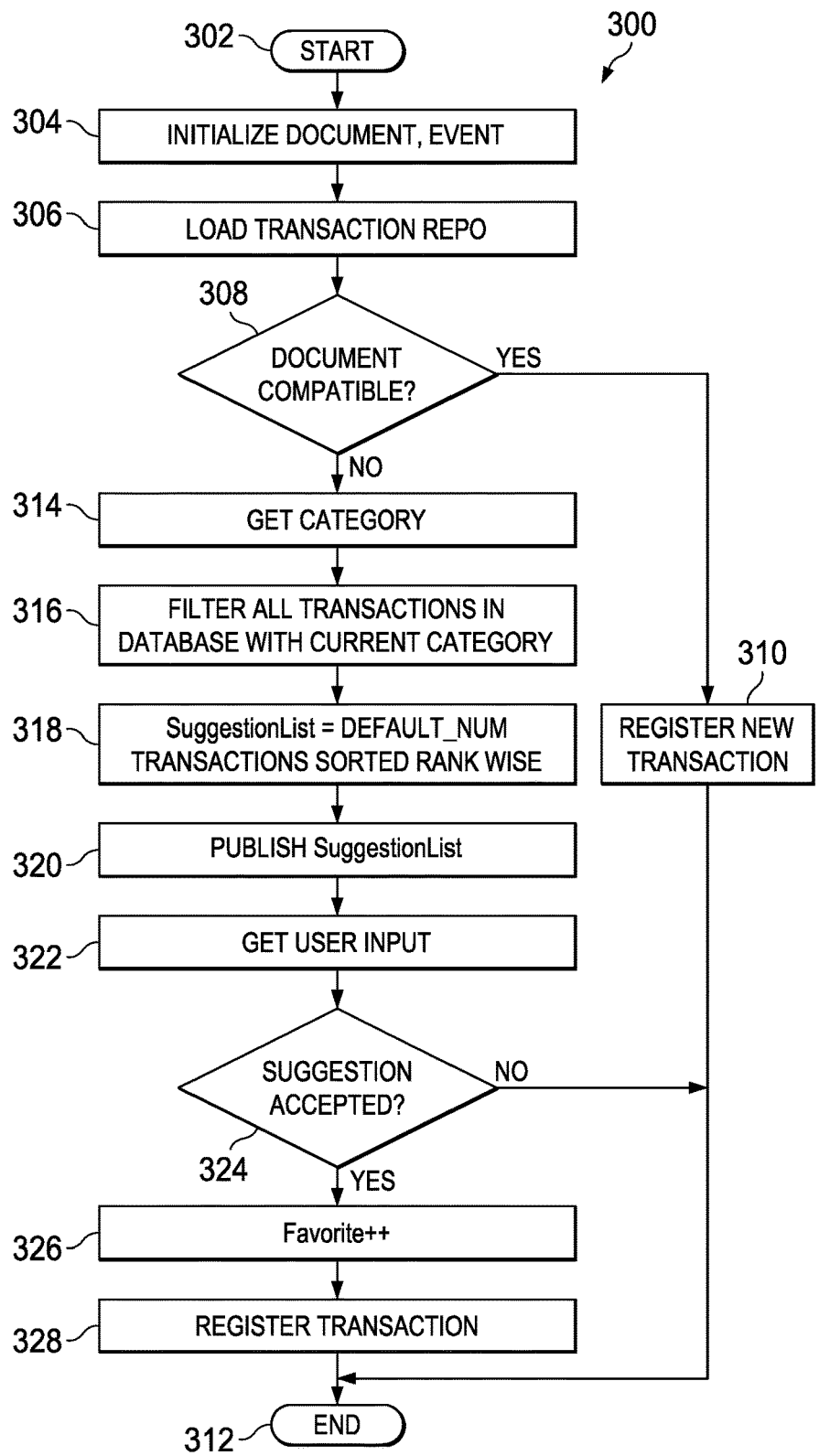
FIG. 3 is a flow diagram for an example process for making suggestions and processing a selected suggestion.

FIG. 3 is a flow diagram for an example process 300 for making suggestions and processing a selected suggestion. For example, the process 300 can be a process implemented as a method for providing suggestions, e.g., consistent with the last method in the code snippet provided below that makes a determination whether or not to provide suggestions. In some implementations, suggestions can be provided when, for example, an event proposed by a user is not compatible with a document that the user is processing. As an example, the event can be a user action (e.g., a user-input formula on multiple columns) that is not compatible with the user's document (e.g., not compatible with data in the spreadsheet). In some implementations, suggestions can be requested by the user at any time, such as to obtain relevant suggestions while the user is operating on specific data (e.g., a particular column in a spreadsheet) and while the user's progress is at a particular stage (e.g., preparation of the data).

At 302, the process 300 can start. For example, the monitoring module 124 can start the process 300 when it is determined that processing by the user is at a stage at which suggestions may be made, e.g., the user is getting ready to perform a user action.

At 304, information associated for the user's current session is initialized. For example, the server 104 can provide information to the monitoring module 124 that indicates the document on which the user is working (e.g., a marketing data spreadsheet) and an event that has or is about to occur (e.g., a user-input formula on multiple columns).

At 306, the transaction repository is loaded. For example, in support of the user's current session on the client device 102, the suggestion module 129 can load information from the transaction repository 111 that is relevant to the user and may be used for providing a suggestion.

At 308, a determination is made whether compatibility exists regarding the user's proposed user action. The compatibility determination is made, for example, between a command that the user is about to execute and the document and underlying data that is to be operated on by the command.

At 310, e.g., if at 308 compatibility was determined not to exist between the document and the user's proposed command, the new transaction can be registered. For example, the transaction module 120 can add the new command to the transaction repository 111.

At 312, the process can end. For example, if the new transaction has been registered at 310, then the process 300 can end without having provided any suggestions.

At 314, a category is defined. For example, the suggestion module 129 can identify a category based on the user identifier associated with User A and a current stage that User A is in. The identified category can also depend on other factors, such as the type of data that User A is working with. The identified category in this example can be along the lines of User=User A, Stage=Visualization, Data=Marketing. In some implementations, the type of data that is being used can be identified, for example, by the names of one or more tables in a database or in other ways.

At 316, transactions in the repository are filtered by category. For example, the suggestion module 129 can identify transactions in the transaction repository 111 that match User=User A, Stage=Visualization, Data=Marketing. Filtering by stage can include, for example, including transactions for stages that are compatible with the current stage.

At 318, the identified transactions are ranked. The ranking module 122, for example, can rank the transactions to create ranked suggestions. For example, the highest-ranked suggestion may correspond to the action the User A has performed more than the other user actions in the same category.

At 320, the ranked suggestions are published. As an example, the interface module 116 can provide the ranked transactions to client application 114 for presentation to the user.

At 322, a user selection of a particular suggestion is received. For example, the interface module 116 can receive, from the client application 114, a selection by the user of a particular one of the ranked transactions.

At 324, an acceptance of the suggestion is received. For example, the interface module 116 can receive an election by User A to execute the user action associated with the selected suggestion. If User A does not accept the suggestion, for example, then the process 300 can end at 312.

At 326, a favorite indicator for the suggestion is updated. For example, the transaction module 120 can increment a counter associated with the number of times that the user action has been performed (e.g., from a suggestion). In some implementations, updating the favorite indicator can depend on a user's indication that a user action is a favorite action and/or should otherwise be presented as a suggestion in the future.

At 328, the transaction is registered. The transaction module 120, for example, can update the transaction repository 111 with information that the transaction has been executed. Once the transaction repository 111 has been updated, the process 300 can end at 312.

FIG. 4 shows an example user interface 400 for working with business data from which transaction information is obtained. For example, the user interface 400 includes a campaign analysis screen 402 in which a user can display and work with data in a data area 404. The data can include, for example, marketing data that measures the performance of a campaign. The user may interact with the data, for example, in stages, such as stages indicated by stage controls 406 (e.g., prepare, visualize, compose, and share). The data presented in the data area 404 can be presented, at least in a current preparation stage, as rows and columns in a spreadsheet, data table, or other structure. For example, marketing data shown in the data area 404 includes data rows organized in columns, e.g., labeled as source, date, city, region and sub-region for columns 410-418, respectively. Other columns are possible, e.g., to differentiate among or provide more information for the entries in the data area 404 that are indicated by rows.

Transactions can be captured, for example, when the user is using the campaign analysis screen 402. The transaction module 120, for example, can receive and store transaction information for, e.g., for top transactions 420, for User A when the user is displaying marketing data and for a particular stage (e.g., when the stage is the prepare stage 406a).

As shown in FIG. 4, the top transactions 420 include a suggestion identifier 422 (e.g., for sequentially numbering suggestions), a feature name 424, a favorites count 426, a frequency count 428, a references count 430, parameters 432, a column name 434, a category 436, and a rank 438. The numbering of the transactions indicated by the suggestion identifier 422 can depend on the rank 438 that can be re-calculated by the ranking module 122 each time transaction information for a transaction is stored or updated. For example, the highest ranked suggestion can have a rank 438 and a suggestion identifier 422, each having the value of one.

Operations performed by the user, for example, can include operations for particular ones of measures 440. Example measures can be related to performance results of a campaign, e.g., including a number of interactions, a number of leads, a number of opportunities, a customer satisfaction score, negative mentions, positive mentions, and a sentiment. Dimensions 442, for example, can include different ways for the user to group and/or annotate data. For example, dimensions can include regions and other geographic indicators, date/time information (e.g., year, quarter, month, week, day(s) or other periods) and categories of actions (e.g., interactions, leads, opportunities).

Figure 5A:
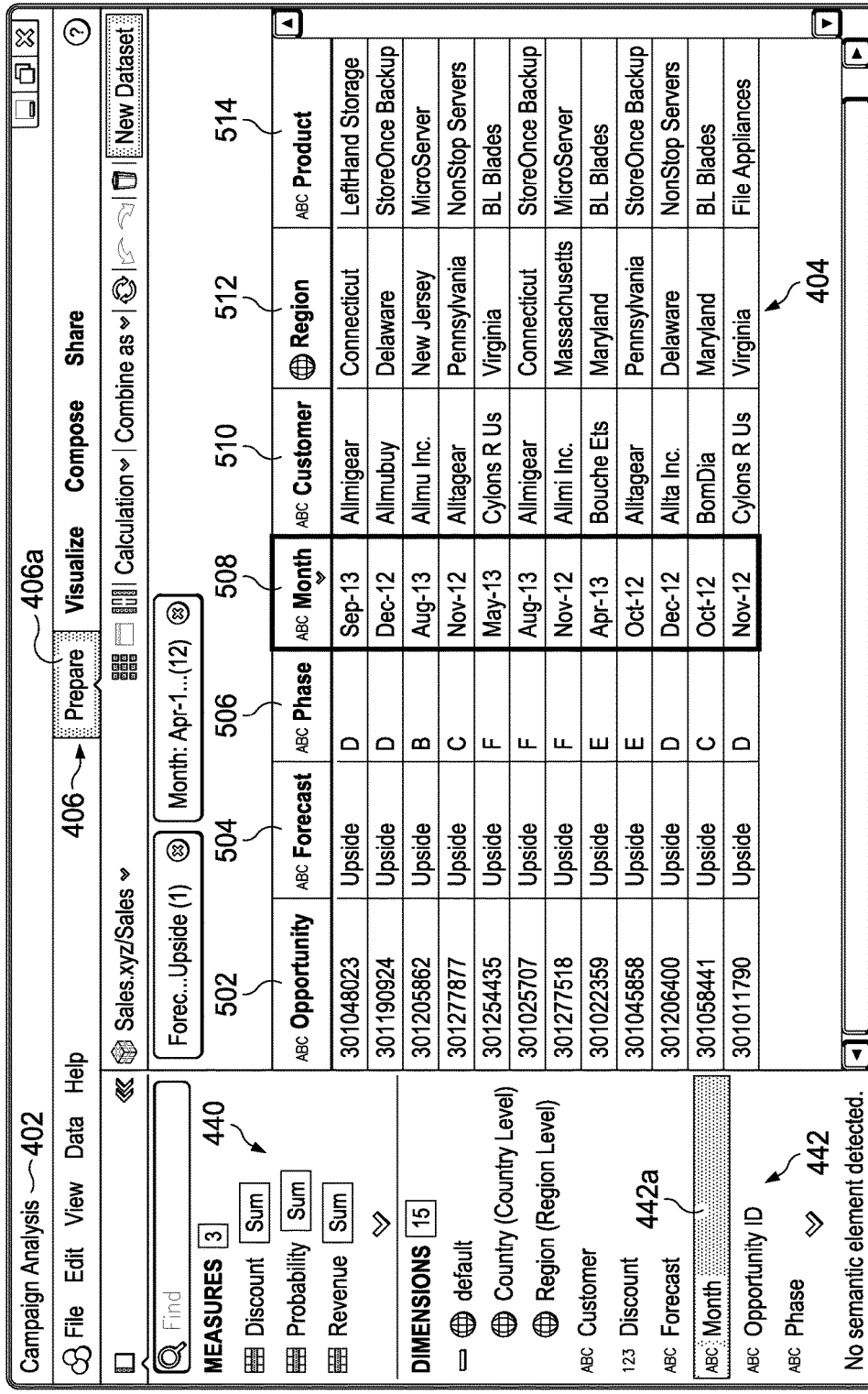
FIGS. 5A-5B collectively show an example user interface for providing suggestions and determining a suggestion selected by the user.
Figure 5B:
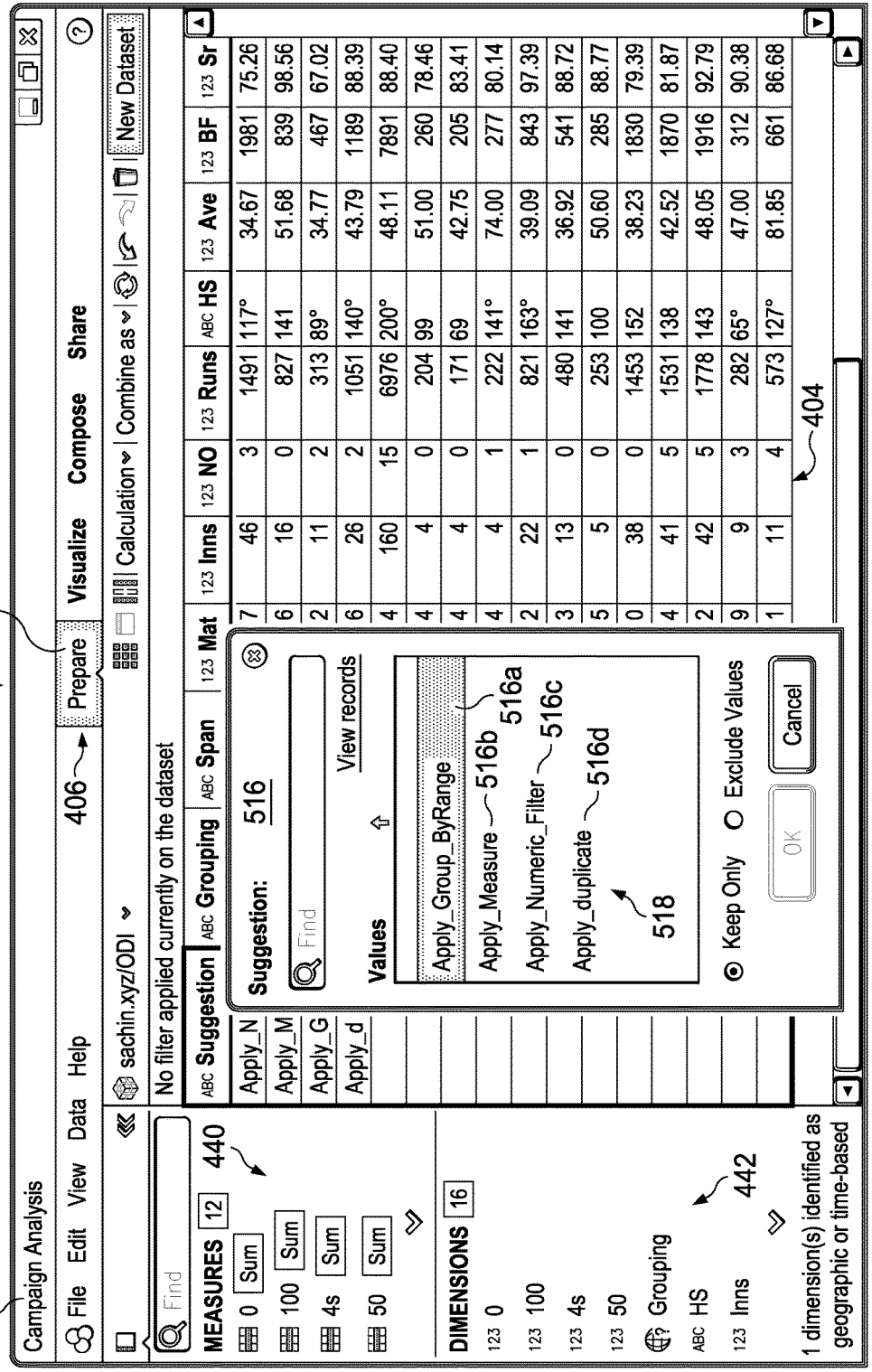

FIGS. 5A-5B collectively show an example user interface 500 for providing suggestions and determining a suggestion selected by the user. For example, the user interface 500 includes the campaign analysis screen 402 in which a user can display and work with data in the data area 404. The current stage, as shown in FIG. 5A, is the prepare stage 406a. Columns displayed in the data area 404 of the user interface 500 include an opportunity 502, a forecast 504, a phase 506, a month column 508, a customer name 510, a region 512 and a product 514. Other columns are possible for use by the user in processing the data, such as columns devoted to a quarter, a year, a state and a country.

Suggestions can be available, for example, when the user is displaying the user interface 500. The suggestion module 129, for example, can generate suggestions (e.g., for top transactions 420) for User A when the user is displaying marketing data during a particular stage (e.g., when the stage is the prepare stage 406a). A different set of suggestions would be provided, for example, when the user is in a different one of the stages (e.g., visualize, compose, or share).

Examples of suggestions that may be provided include suggestions associated with the top transactions 420. In some implementations, suggestion can be provided to the user in an interface, such as a suggestions popup 516 (See FIG. 5B) or other control, that lists specific information about each suggestion. Suggestions listed in the suggestions popup 516, for example, correspond to the transactions described above with reference to FIG. 4. For example, suggested feature names 518 can correspond to corresponding ones of the feature names 424. Further, the suggestions that appear in the suggestions popup 516 can be ranked by the rank 438.

As shown in FIG. 5A, a month dimension 442a is selected, which corresponds to the month column 508. In some implementations, the user can limit suggestions that are to be presented by selecting a particular column or other entity on the screen.

The suggestions popup 516, for example, can include suggestions 516a-516d, each associated with a different operation, such as applying a group-by range, applying a measure (e.g., one of the measures 440), applying a numeric filter, or applying a duplication, respectively.

Figure 6:
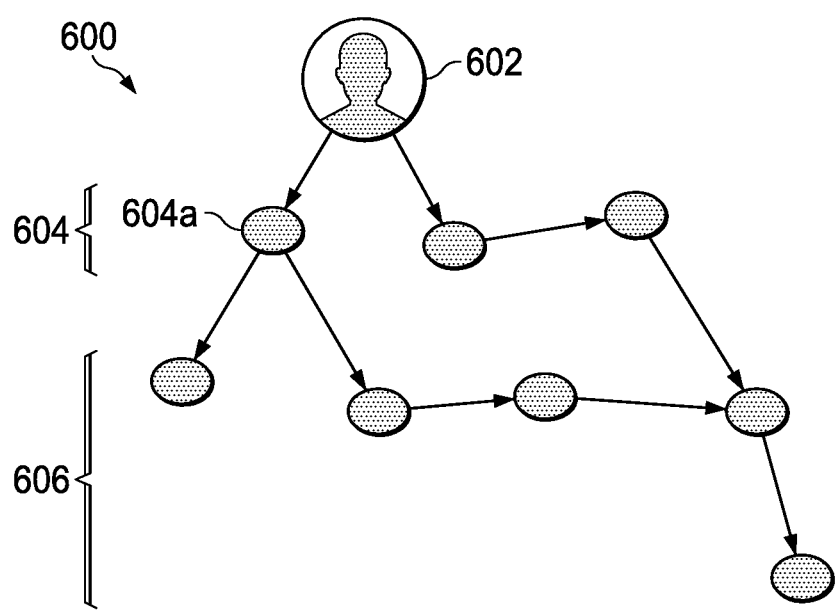
FIG. 6 is a diagram of an example hierarchical structure for maintaining transaction information.

FIG. 6 is a diagram of an example hierarchical structure 600 for maintaining transaction information. For example, the hierarchical structure 600 is shown as a tree consisting of nodes. A similar tree (or other structure for organizing transaction data) can exist for each user. Over time, e.g., as a user performs user actions, leaf nodes and other nodes can be continuously added to the tree, each representing a different type of user action. Further, nodes in the tree can be updated, e.g., to increment a number of times that a transaction has occurred and/or a suggestion has been selected.

A root node 602, for example, can represent a particular user. Objects on which the user has operated can be represented as object nodes 604, such as including a node 604a associated with marketing data. Other ones of the object nodes 604 can correspond to other types of data. Object nodes 604 (or other intermediate nodes in the tree) can include or represent specific operations performed on objects, such as nodes corresponding to selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset. Parameter nodes 606, for example, can be subordinate to the object nodes 604 (e.g., also including operations). For example, for a given object and operation, the parameter nodes 606 can identify information such as what measure the user used, what dimension the user generally has in his visualization, what kind of filter the user applies on a dataset, and what formula the user applies on a column. Other types of nodes are possible, and other representations are possible for representing transactions and transaction information for a given user. In some implementations, nodes of trees of different users can be linked, e.g., if user actions and suggestions are sharable across groups of users, users in particular roles, or other types of shared information.

Figure 7:
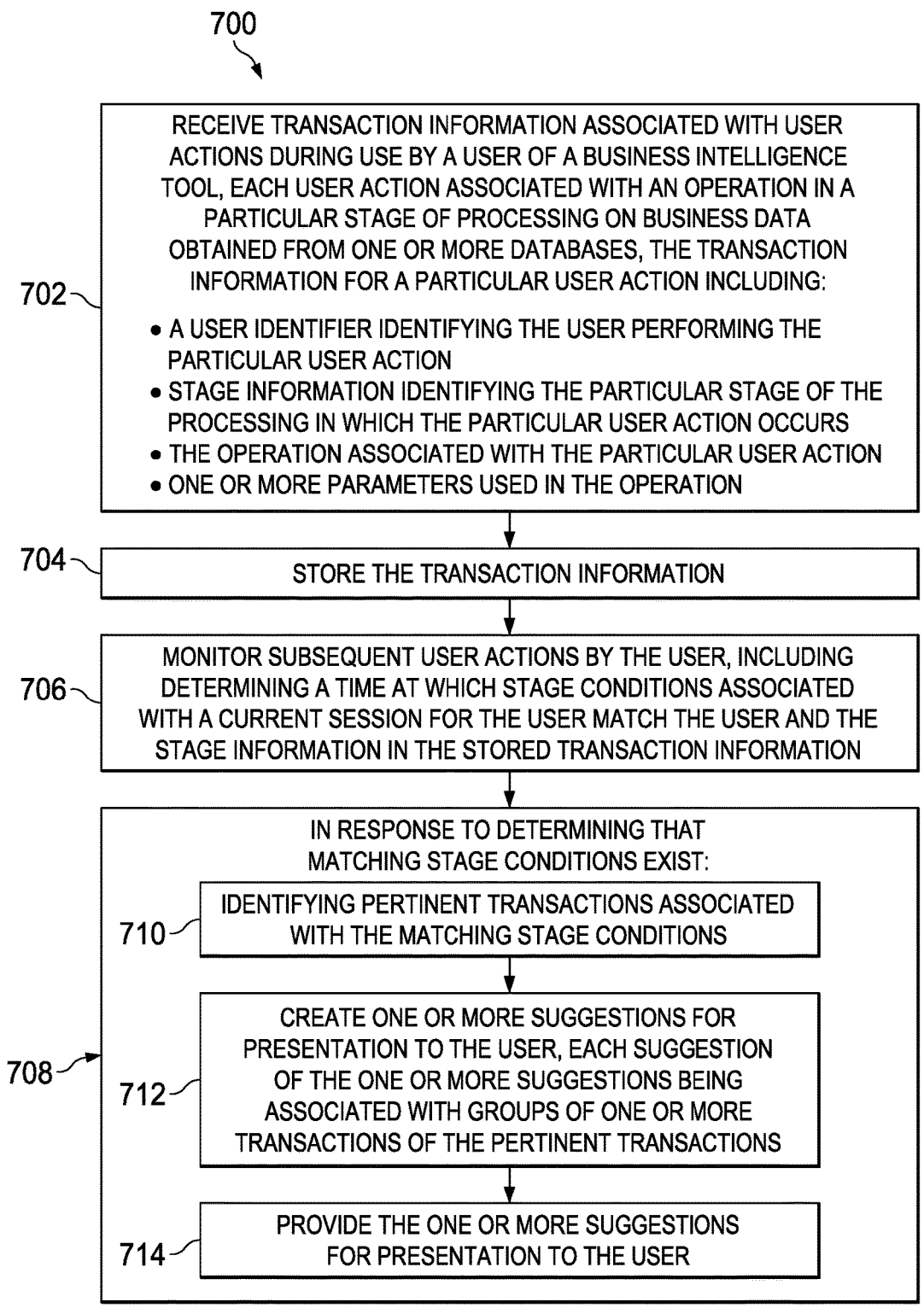
FIG. 7 is a flowchart of an example method for providing suggestion.

FIG. 7 is a flowchart of an example method 700 for providing suggestions. For clarity of presentation, the description that follows generally describes method 700 in the context of FIGS. 1-6. However, it will be understood that the method 700 may be performed, for example, by any other suitable system, environment, software, and hardware, or a combination of systems, environments, software, and hardware as appropriate. For example, the server 104 and/or its components can be used to execute the method 700.

At 702, transaction information is received that is associated with user actions during use by a user of a business intelligence tool. Each user action is associated with an operation in a particular stage of processing on business data obtained from one or more databases. The transaction information for a particular user action includes, for example, a user identifier identifying the user performing the particular user action, stage information identifying the particular stage of the processing in which the particular user action occurs, the operation associated with the particular user action, and one or more parameters used in the operation. For example, interface module 116 can receive, e.g., from the client application 114, information that identifies a user action that the user performed, such as a filtering command executed in a spreadsheet. The received information can identify the user, for example, as User A, and further identify a context of the user action. The context, for example, can include stage information (e.g., identifying the current stage as a data preparation stage), a particular operation (e.g., filtering), and parameters (e.g., a filter-by argument).

In some implementations, stages are sequential and include a data preparation stage in which data is prepared, a visualization stage in which data is presented in a visualization to the user, a synthesis stage in which a business story is created from one or more visualizations, and a sharing stage in which business information associated with previous stages is shared. For example, stages can be labeled within a user interface (e.g., for a spreadsheet) associated with the business intelligence tool.

In some implementations, user actions in the data preparation stage include selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset. For example, the user action identified for the transaction can be the action of "filtering the data set" such as if the user is filtering data in a spreadsheet by a particular argument or value.

At 704, the transaction information is stored. The transaction module 120, for example, can store the transaction information in the transaction repository 111. In some implementations, before storage of the transaction information, a rank (or a new rank) can be calculated for the transaction. The rank and other information stored for each transaction can be used to determine how information from the transaction repository 111 is used later to generate suggestions.

At 706, subsequent user actions by the user are monitored, including determining a time at which stage conditions associated with a current session for the user match the user and the stage information in the stored transaction information. For example, the monitoring module 124 can monitor user actions and current stage information, e.g., during a session by the user using the client application 114.

At 708, in response to determining that matching stage conditions exist, additional processing occurs. For example, the monitoring module 124 can determine that conditions exist for which suggestions are to be determined for the user, such as when the user is at a certain point in using data within the client application 114.

At 710, pertinent transactions associated with the matching stage conditions are identified. The transaction module 120, for example, can identify matching transaction information from the transaction repository 111 that correspond to the user (e.g., user identifier=User A) and that match a current stage (e.g., the user is in the Data Preparation stage).

At 712, one or more suggestions are created for presentation to the user. Each suggestion of the one or more suggestions is associated with groups of one or more transactions of the pertinent transactions. For example, the suggestion module 129 can prepare a set of suggestions that are to be provided to the user.

At 714, the one or more suggestions are provided for presentation to the user. For example, the application server 112 can provide the suggestions to the client device 102, e.g., for presentation to the user using the client application 114. The suggestions can be presented to the user, for example, in the suggestions popup 516.

In some implementations, the method 700 further includes, after providing the one or more suggestions, additional steps. An identification of a particular suggestion is received from the provided one or more suggestions. Using the identified particular suggestion, a new operation is performed that uses transaction information for the particular suggestion in a new operation on business data being manipulated by the user. Performing the operation includes using the one or more parameters from the stored transaction information. The stored transaction information for the particular suggestion is updated to indicate an additional use of an associated user action. For example, the user can select one of the suggestions in the suggestions popup 516. Upon selection of the particular suggestion, information associated with the suggestion can be used to perform the corresponding operation (e.g., filtering a data set by a filter parameter). Because the suggestion has been used, information for the associated transaction can be updated in the transaction repository, e.g., incrementing a count regarding the number of times that the transaction has occurred.

In some implementations, the method 700 further includes ranking the suggestions to produce ranked suggestions. For example, each ranked suggestion can be ranked according to a transaction rank determined from one or more of a favorite index, a frequency count, and a references count. For example, the ranking module 122 can rank the set of suggestions that are to be provided to the user. The rank can be based, for example, on a formula (e.g., weighted formula) that is a function of the number of times that the user has indicated that the transaction is a favorite, the frequency count, and the references count. The references count, for example, indicates the number of times the transaction is indirectly referred to in other transactions. For example, a transaction of a filter and a transaction of applying a formula on a filtered column may be identified. Here, filtering the column is indirectly referred to by applying the formula, and would represent a reference count. Conversely, the frequency count identifies the number of times the transaction occurs.

In some implementations, the one or more suggestions provided to the user include, for each ranked suggestion, a suggestion identifier, a feature name, the favorite index, the frequency count, the references count, one or more parameters, one or more column names associated with the one or more parameters, a stage category, and a transaction rank. For example, the suggestions popup 516 can include (or provide access to) specific information associated with each suggestion.

In some implementations, each ranked suggestion is further ranked using a measure of time since an occurrence of an associated user action. For example, a transaction that has occurred four times very recently may be ranked higher as a suggestion than a transaction that occurred five times, e.g., if those five times were several days ago.

The steps of the example method 700 provide a few implementations that can be used for generating suggestions. Other implementations are possible, and may be implemented using code that is provided in a BI tool as a plug-in, for example.

In some implementations, the following code snippet or some other code can be used for handling (processing, storing, accessing) transactions and generating suggestions based on the transactions:

```
class Transaction {
    int id,String feature, String columnName , String [ ] parameters , int trsanaction_parameter_frequency,int favourit, int feature_frequency,String category,int rank;
    Transaction(int id,String feature, String columnName , String [ ] parameters , int trsanaction_parameter_frequency,int favourit, int feature_frequency,String category,int rank) {
        this.id = id;
    }
    public int getId( ) {
        return this.id;
    }
    public String getColumn( ) {
        return this.columnName;
    }
    public String [ ] getParameters( ) {
        return this.parameters;
    }
    public String getFeature( ) {
        return this.feature;
    }
```

```
        public String getCategory( ) {
            return this.category;
        }
            public int getFavourit( ) {
                    return this.favourit;
            }
            public void setFavourit(int favourit) {
            this.favourit = favourit;
            }
}
class Transactions {
    public ArrayList<String> transactionColumnList = new ArrayList <String> ( );
    public int rowCount;
    private static Transactions transactions;
    public static Transactions getInstance( ) {
        if( null == transactions) {
            transactions = new Transactions( );
        }
        return transactions;
    }
    Transactions ( ) {
        // load transaction from database
                // -- connect to transaction database at launch time
                // -- read result set
                //-- construct Transaction object for each row
                // -- register Transaction into Transactions object
        this.rowCount = databaseRowCount;
    }
    HashMap <int ,Transaction> transactionMap = new HashMap <int,
TransactionMap>;
    public void registerTransaction (Transaction newTrsansaction) {
        transactionMap.put(newTrsansaction.getId( ),newTrsansaction);
        this.putColumnName(newTrsansaction.getColumn( ));
    }
    public Transaction getTransaction(int id) {
        return transactionMap.get(id);
    }
    public void serailizeTransactions( ) {
        // write each trsnsaction to database row by row
    }
    public void putColumnName(String columnName) {
        transactionColumnList.put(columnName)
    }
    public ArrayList<String> getColumnList( ) {
        return transactionColumnList;
    }
}
/******************************************/
public RegisterTransaction{
   //constants
final int BASE_WEIGHT = 500;
    final int FAVOURTIE_WEIGHT = 100;
    final int trsanaction_parameter_frequency_WEIGHT = 20;
    final int PARAMETER_WEIGHT = 10;
    final int feature_frequency_WEIGHT = 5;
    final int ORDER_WEIGHT = 1;
static int id = 1;
registerTransaction(Event event , Transactions transactions) {
    boolean includeNewTransaction = true;
        Transactions transactions = transactions;
        int id = 1,String feature = event.getFeature, String columnName =
event.getColumn , String [ ] parameter = event.getParameters,
        int trsanaction_parameter_frequency = 1,int favourit = 0, int feature_frequency =
0,long rank;
        String category = event.getRoomName;
        if(transactions.rowCount == 0) {
            // register new transaction
            rank = getRank(id ,trsanaction_parameter_frequency ,favourite,
feature_frequency, parameter_count);
            transactions.registerTransaction(new Transaction(id , feature, columnName ,
parameter , trsanaction_parameter_frequency , favourit , feature_frequency , category ,
rank));
            boolean includeNewTransaction = false;
        }
        else {
    // Check if the curr transaction already exists in the db. if yes then update the
existing transaction else insert
            for (int transaction_counter = 0 ; transaction_counter <
transactions.rowCount ; transaction_counter ++ )
```

```
                {
                        Transaction transaction =
transactions.getTransaction(transaction_counter);
                        parameter = event.getParameters;
                        // update feature frequency if transaction already exist.
                        if(transaction.getFeature( ).equals(feature)) {
                                feature_frequency = transaction.getfeature_frequency( ) + 1;
                        // update transaction_param frequency if both transaction and
parameter already exist.
                        if(transaction.ColumnName( ).equals(columnName)) {
                                trsanaction_parameter_frequency =
transaction.gettrsanaction_parameter_frequency( ) + 1;
                        }
                        int rank = rank = getRank(id ,trsanaction_parameter_frequency,
favourite ,feature_frequency, parameter_count);
                        // upate exisiting transaction if frequencies are updated
                        Transaction updateExisitingTransaction =
transactions.registerTransaction(new Transaction(transaction_counter , feature,
columnName , parameter , trsanaction_parameter_frequency , favourit ,
feature_frequency , category ,rank))
                        boolean includeNewTransaction = false;
                        }
                }
                if(  includeNewTransaction) {
                        //calc and store rank and increment id
                        rank = getRank(transactions.rowCount ,trsanaction_parameter_frequency,
favourite ,feature_frequency, parameter_count);
                        transactions.registerTransaction(new Transaction(transactions.rowCount ,
feature, columnName , parameter , trsanaction_parameter_frequency , favourit ,
feature_frequency , category ,rank))
                }
        }
        id++;
}
    public int getRank(int id , long base_weight , int trsanaction_parameter_frequency ,
int trsanaction_parameter_frequency_weight , int favourit , int favourit_weight, int
feature_frequency , int feature_frequency_weight, int parameter_count , int parameter ){
        int rank = BASE_WEIGHT − (id * ORDER_WEIGHT) +
trsanaction_parameter_frequency * trsanaction_parameter_frequency_WEIGHT +
parameter_count * PARAMETER_WEIGHT
                                                        + (favourite? 1:0) *
FAVOURTIE_WEIGHT + feature_frequency * feature_frequency_WEIGHT;
    }
}
/***********************************************/
class suggestTransaction {
    suggesttionTransaction(document,event) {
        Transactions transactions = Transactions.getInstance( );
        boolean isDocumentCompatible = isDocumentCompatible(transactions,event);
        // check if newly acquired document is subset or superset of transaction object
        if (!isDocumentCompatible) {
                new registerTransaction(transactions,event , 0);
        }
        else {
                String current_category = event.getRoomName;
                // first load only top 5 suggestions for given category.
                Iterator <Transaction> transactionItr =
transactions.getColumnList( ).iterator( );
                ArrayList<Transaction>suggestionListForRoom = new
ArrayList<Transaction> ( );
                while ( transactionItr.hasNext( )) {
                   Transaction currentTransaction = transactionItr.next( );
                   if(currentTransaction.getCategory( ).equals(current_category)) {
                      suggestionListForRoom.add(currentTransaction);
                   }
                }
                publishSuggestionEvent(transactions, suggestionListForRoom , callback);
// the suggestions are sent to user and callback is awaited.
    // we can also suppress the suggestions after given time
        }
    }
    public boolean isDocumentCompatible(transactions,event) {
        ArrayList<String> current_Document_ColumnName = event.getColumnList;
        ArrayList<String> transaction_db_ParamName = transactions.getColumnList( );
        return
(current_Document_ColumnName.containsAll(transaction_db_ParamName)
            || transaction_db_ParamName.containsAll(transaction_db_ParamName));
    }
    public void publishSuggestionEvent(ArrayList<Transaction> suggestionListForRoom,
```

```
Event callback)
    if(!callback.equals("-1") {
            Transaction selectedTransaction =
suggestionListForRoom.get(callback.id);
            int favourit = selectedTransaction.getFavourit( ) + 1;
            selectedTransaction.setFavourit(favourit);
            // update the transaction database;
            //apply the transaction
            applyTransaction(selectedTransaction);
            // in prepare room -> display both transaction and param
            // in visualization room -> display either only charts or chart + parama
            // in share room -> suggest emails, top server details
            transactions.registerTransaction(selectedTransaction);
        }
}
```

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a Web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communications between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a Web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A method comprising:
   receiving transaction information associated with user actions during use by a first user of a business intelligence tool, each user action associated with an operation in a particular stage of processing on business data obtained from one or more databases, the transaction information for a particular user action including:
 a user identifier identifying the first user performing the particular user action;
 stage information identifying the particular stage of the processing in which the particular user action occurs;
 the operation associated with the particular user action; and
 one or more parameters used in the operation;
storing the transaction information;
monitoring subsequent user actions by the first user in a current session, wherein monitoring subsequent user actions includes determining a time at which stage conditions associated with the current session for the first user match a portion of the stored transaction information corresponding to the first user and the stage information; and
in response to determining that stage conditions exist in the stored transaction information that match the first user and the stage conditions of the current context:
 identifying pertinent transactions associated with the matching stage conditions;
 creating one or more suggestions for presentation to the first user, each suggestion of the one or more suggestions being associated with groups of one or more transactions of the pertinent transactions; and
 providing the one or more suggestions for presentation to the first user.

2. The method of claim 1, further comprising, after providing the one or more suggestions:
 receiving an identification of a particular suggestion from the provided one or more suggestions;
 performing, using the identified particular suggestion, a new operation using transaction information for the particular suggestion in a new operation on business data being manipulated by the first user, including using the one or more parameters from the stored transaction information; and
 updating the stored transaction information for the particular suggestion to indicate an additional use of an associated user action.

3. The method of claim 1, wherein stages are sequential and are selected from the group comprising a data preparation stage in which data is prepared, a visualization stage in which data is presented in a visualization to the first user, a synthesis stage in which a business story is created from one or more visualizations, and a sharing stage in which business information associated with previous stages is shared.

4. The method of claim 3, wherein user actions in the data preparation stage include actions selected from a group comprising: selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset.

5. The method of claim 1, further comprising ranking the suggestions to produce ranked suggestions.

6. The method of claim 5, wherein each ranked suggestion is ranked according to a transaction rank determined from one or more of a favorite index, a frequency count, and a references count.

7. The method of claim 6, wherein the one or more suggestions provided to the first user include, for each ranked suggestion, a suggestion identifier, a feature name, the favorite index, the frequency count, the references count, one or more parameters, one or more column names associated with the one or more parameters, a stage category, and a transaction rank.

8. The method of claim 6, wherein each ranked suggestion is further ranked using a measure of time since an occurrence of an associated user action.

9. A system comprising:
 at least one memory storing:
  a transaction repository defining transaction information received from the plural client devices, including information for specific user actions on business data being used, manipulated or otherwise processed; and
 an application for:
  receiving the transaction information associated with user actions during use by a first user of a business intelligence tool, each user action associated with an operation in a particular stage of processing on business data obtained from one or more databases, the transaction information for a particular user action including:
   a user identifier identifying the first user performing the particular user action;
   stage information identifying the particular stage of the processing in which the particular user action occurs;
   the operation associated with the particular user action; and
   one or more parameters used in the operation;
  storing the transaction information;
  monitoring subsequent user actions by the first user in a current session, wherein monitoring subsequent user actions includes determining a time at which stage conditions associated with the current session for the first user match a portion of the stored transaction information corresponding to the first user and the stage information; and
  in response to determining that stage conditions exist in the stored transaction information that match the first user and the stage conditions of the current context:
   identifying pertinent transactions associated with the matching stage conditions;
   creating one or more suggestions for presentation to the first user, each suggestion of the one or more suggestions being associated with groups of one or more transactions of the pertinent transactions; and
   providing the one or more suggestions for presentation to the first user.

10. The system of claim 9, further comprising in the application, after providing the one or more suggestions:
 receiving an identification of a particular suggestion from the provided one or more suggestions;
 performing, using the identified particular suggestion, a new operation using transaction information for the particular suggestion in a new operation on business data being manipulated by the first user, including using the one or more parameters from the stored transaction information; and
 updating the stored transaction information for the particular suggestion to indicate an additional use of an associated user action.

11. The system of claim 9, wherein stages are sequential and are selected from the group comprising a data preparation stage in which data is prepared, a visualization stage in which data is presented in a visualization to the first user, a synthesis stage in which a business story is created from one or more visualizations, and a sharing stage in which business information associated with previous stages is shared.

12. The system of claim 11, wherein user actions in the data preparation stage include actions selected from a group comprising: selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset.

13. The system of claim 9, further comprising in the application ranking the suggestions to produce ranked suggestions.

14. The system of claim 13, wherein each ranked suggestion is ranked according to a transaction rank determined from one or more of a favorite index, a frequency count, and a references count.

15. A non-transitory computer-readable media encoded with a computer program, the program comprising instructions that when executed by one or more computers cause the one or more computers to perform operations comprising:
receiving transaction information associated with user actions during use by a first user of a business intelligence tool, each user action associated with an operation in a particular stage of processing on business data obtained from one or more databases, the transaction information for a particular user action including:
a user identifier identifying the first user performing the particular user action;
stage information identifying the particular stage of the processing in which the particular user action occurs;
the operation associated with the particular user action; and
one or more parameters used in the operation;
storing the transaction information;
monitoring subsequent user actions by the first user in a current session, wherein monitoring subsequent user actions includes determining a time at which stage conditions associated with the current session for the first user match a portion of the stored transaction information corresponding to the first user and the stage information; and
in response to determining that stage conditions exist in the stored transaction information that match the first user and the stage conditions of the current context:
identifying pertinent transactions associated with the matching stage conditions;
creating one or more suggestions for presentation to the first user, each suggestion of the one or more suggestions being associated with groups of one or more transactions of the pertinent transactions; and
providing the one or more suggestions for presentation to the first user.

16. The non-transitory computer-readable media of claim 15, the operations further comprising, after providing the one or more suggestions:
receiving an identification of a particular suggestion from the provided one or more suggestions;
performing, using the identified particular suggestion, a new operation using transaction information for the particular suggestion in a new operation on business data being manipulated by the first user, including using the one or more parameters from the stored transaction information; and
updating the stored transaction information for the particular suggestion to indicate an additional use of an associated user action.

17. The non-transitory computer-readable media of claim 15, wherein stages are sequential and are selected from the group comprising a data preparation stage in which data is prepared, a visualization stage in which data is presented in a visualization to the first user, a synthesis stage in which a business story is created from one or more visualizations, and a sharing stage in which business information associated with previous stages is shared.

18. The non-transitory computer-readable media of claim 17, wherein user actions in the data preparation stage include actions selected from a group comprising: selecting a dataset, selecting a column in the data set, selecting a custom range in the data set, filtering the data set, sorting the data set, converting the data set, renaming the data set, create a measure or dimension for the data set, creating a hierarchy for the data set, duplicating data in the data set, and grouping data by range in the dataset.

19. The non-transitory computer-readable media of claim 15, the operations further comprising ranking the suggestions to produce ranked suggestions.

20. The non-transitory computer-readable media of claim 19, wherein each ranked suggestion is ranked according to a transaction rank determined from one or more of a favorite index, a frequency count, and a references count.

* * * * *